March 3, 1953
R. ZIDE
2,630,113
PERCOLATOR COVER WITH AUDIBLE SIGNAL MEANS
Filed March 5, 1951
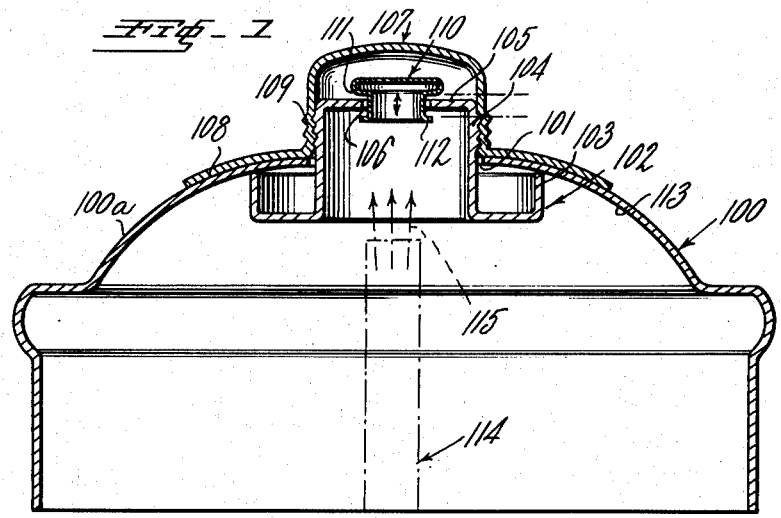
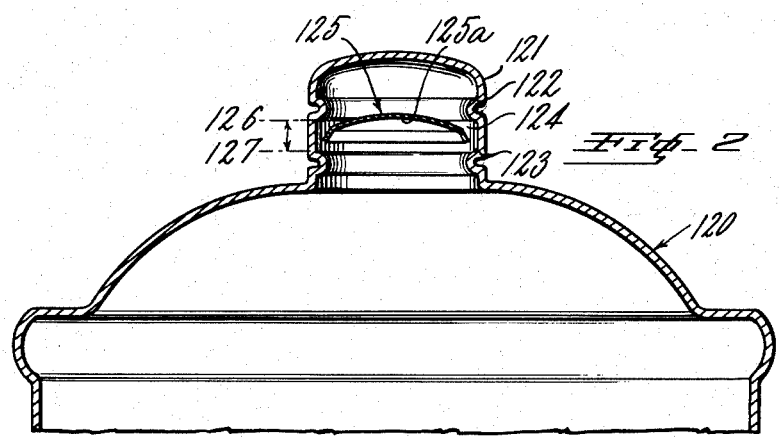
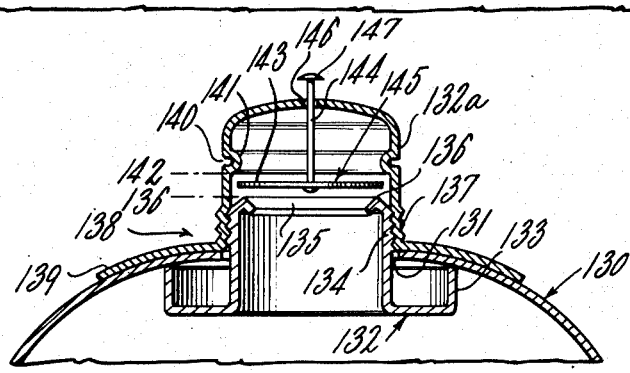
INVENTOR.
RALPH ZIDE
BY Patented Mar. 3, 1953

2,630,113

UNITED STATES PATENT OFFICE 2,630,113

PERCOLATOR COVER WITH AUDIBLE SIGNAL MEANS

Ralph Zide, Brooklyn, N. Y., assignor to Perc-Tone Aluminum Products, Inc., Brooklyn, N. Y., a corporation of New York Application March 5, 1951, Serial No. 213,970

6 Claims. (Cl. 126—388)

1

This invention relates to percolators and similar kitchen appliances and deals more specifically with the cover construction of such appliances.

It is well known to employ in percolator structures a cover to which is removably connected a top piece or cap made of glass or similar transparent material which permits observing spurts of boiling of water within the percolator pot from therewithout. Thus, a person's attention is attracted by rather visible than audible signals. These top pieces, even if made of heat resistant glass material become easily loose on the cover, are often misplaced and damaged and are subject to replacement.

The present invention overcomes these and other disadvantages and provides means ensuring the manufacture of a simplified cover for kitchen appliances, in particular for percolators, which is integral with the top piece and which is associated with audible and visible signal means.

It is another object of the invention to provide means affording an efficient signal means structure for percolator covers which also guides the boiling mixture of coffee and water and prevents the oily ingredient contained in the coffee from being deposited within the top piece of the percolator.

It is a further object of the invention to provide means facilitating easy mounting of said signal means within the percolator cover and ready removal of the signal means from the cover for cleaning and similar purposes.

Yet another object of the invention is to provide means permitting predetermined reciprocable movement of the signal means within the top piece of said percolator cover.

Still a further object of the invention resides in the provision of means conducive to efficient operation of audible signal means built in covers of percolators and like kitchen appliances.

A still further object of the present invention is to provide means improving the performance and contributing to a simplified, compact and inexpensive cover having readily accessible parts and to its ease of operation.

With the above and other objects in view, the invention will be hereinafter more particularly described and the combination and arrangement of parts will be shown in the accompanying drawing and pointed out in the claims which form part of the specification.

In the drawing:

Fig. 1 is a sectional view of an assembled cover of a percolator having incorporated therein signal means in accordance with the invention.

2

Fig. 2 is a sectional view of a cover made from one piece of material with signal means placed therein and made in accordance with the invention.

Fig. 3 is a fragmentary sectional view of the upper part of an assembled percolator cover with signal means different from those shown in Figs. 1 and 2.

Referring now more particularly to the drawing there is disclosed in Fig. 1 a cover 100 for a percolator having the central opening 101. Through this central opening 101 extends an inner holder piece 102 having an upwardly turned ring-shaped flange 103 and an upper threaded portion 104 which terminates into the upper or top plate 105 provided with an opening 106.

An outer holder piece 107 having the circular flange 108 conformed to the curve-shaped upper cover portion 100a is provided with inner threads 109 adapted for coaction with upper threaded portion 104 of inner holder piece 102. Seated on upper plate 105 of inner holder piece 102 is a hollow floater body 110 having the upper flange portion 111 and the lower flange portion 112.

The lower flange portion is passed through opening 106 under pressure and is subsequently crimped so as to determine the reciprocal movement of floater 110 in upward and downward directions whereby the flanges 111 and 112 in their extreme positions abut against the upper and lower surfaces of top plate 105, as it is well understood.

The assembly of the percolator cover top may be readily accomplished by engaging outer holder piece 107 with inner holder piece 102 through the threads 104 and 109 whereby the upstanding flange 103 abuts against the inner surface 113 of the cover 100, whereas the curved flange 108 of the outer holder piece 107 comes to lie against the curved upper portion 100a of said cover.

Since the coffee and water mixture from within the percolator is forced in spurts out of stem 114 (extending a predetermined height from within the percolator pot) into cover 100 against the floater 110 in accordance with arrows 115, it will be readily realized that a reciprocal movement of the signal means constituted by the floater 110 is attained which through abutments of its flanges 111, 112 against top plate 105 becomes audible and indicates the state of the coffee in preparation.

Since the floater 110 is in the shape of a hollow sleeve relatively light in weight, water drops and vapor may cause movement of floater 110 in the manner intended. If it is desired to observe the movement of floater 110 from without the cover it is further proposed to manufacture the outer holder piece 107 or at least part thereof of transparent material, such as glass, plastic composition, etc.

Fig. 2 shows a section through a cover 120 which has an integral top 121 in which there are provided two spaced apart grooves 122, 123 between which is created a space 124 so that a downwardly curved floater 125 forced into said space 124 in any appropriate manner may move for abutment against the lower rim or inner projection 126 of the wall provided with groove 122 as well as against the upper rim or inner projection 127 of the wall provided with groove 123. Thus a movement of floater 125 will take place at a level above the wall of cover 120 and within the limits of spaced rims 126, 127. Since floater 125 is upwardly curved any oily substance from the coffee carried by water parts or particles will be prevented from being deposited on the inner surface 125a of outer floater 125.

If desired, floater 125 may be provided with a central rod extending through the top 121 in a manner similar to that explained hereinafter with respect to the structure shown in Fig. 3.

In Fig. 3 the uppermost cover portion 130 is shown having the central opening 131 through which extends the inner or lower holder or coupling piece 132 provided with the upstanding flange 133. Inner holder piece 132 has further threaded portion 134 which terminates in an inwardly and downwardly turned ring-shaped flange 135 forming an annular upper sharp edge 136. In engagement with threads 134 are threads 137 of outer holder piece 132a of top 138, to maintain the latter in assembled condition on cover 130 and for removal therefrom.

A flange 139 extends from the threaded portion 137 and is shaped to conform to the outer surface of cover 130 as may be readily seen in Fig. 3. In this particular instance the top or outer holder piece 138 has a circular groove 140 defining an inner ring-shaped welt or projection 141 terminating in a lower rim 142 for the abutment of signal means 145.

The upper annular edge 136 forms the lower limit for the movement of said signal means 145. Signal means 145, in this particular instance, is formed by a substantially flat round disk plate 143 having a central stem or rod 144 which is passed through opening 146 provided in top 138. Rod 144 terminates in a rivet-like head 147. Instead of said rivet head a small nut may be arranged at the end of rod 144 to adjust the movements of the plate signal means 145. It will be readily understood that the signal means 145 as shown may be replaced by signal means 125 as seen in Fig. 2 (devoid of guide rod 144).

Although the plate 143 is shown in substantially flat form it is also understood that the same may be shaped according to the floater 125 of Fig. 2 and that perforations may pass through plate 143 in order to ensure that boiling water from the hollow stem 114 may readily escape from top 138 and will be returned to the percolator.

The embodiments of the invention as shown in Figs. 1 to 3 have the feature in common that the floater or signal means 110, 125 and 145 are arranged somewhat at approximately half the height of the top piece and are limited in their reciprocal upward and downward movements by means integral with or extending from the inner wall surface of the top piece. When the signal means or floater "bobs" up and down the same is substantially guided between the limit or stop means either by a part of the floater (for instance, 110 and 145) and/or by the wall of the top piece (for instance, 125, 145).

It can thus be seen that there has been provided in accordance with the invention a cover for a percolator or like kitchen utensil with built-in signal means which is audible and, if desired, also visible, said cover comprising a body having a curved upper surface wall, a hollow top piece having an inner wall and extending centrally from said surface wall thereabove, a floater accommodated within the hollow space of said top piece and arranged for up and down movement therein when impinged upon by spurts of boiling water from within the percolator pot, and means extending from the inner wall of said top piece into the hollow space thereof for limiting said movement of said floater within said top piece, said floater upon abutment against said means producing audible signals from within said top piece for perception therewithout.

While several preferred embodiments of the invention have been shown and herein described, it will be understood that the same is capable of modifications without departure from the general scope and spirit of the invention as defined in the claims.

Having thus described the invention, what is claimed as new and desired to be secured by Letters Patent, is:

1. A cover for a percolator pot comprising a body having an upper surface wall, a hollow top piece having an inner wall and extending centrally from said surface wall thereabove, a floater accommodated within the hollow space of said top piece and at a level above said upper surface wall and arranged for reciprocal up and down movement therein when impinged upon by spurts of boiling water from within the percolator pot, abutment means extending from the inner wall of said top piece into the hollow space of the latter for limiting said movement of said floater within said top piece, said floater upon striking against said abutment means producing audible signals from within said top piece for perception therewithout and means guiding said floater during its reciprocal movement against displacement in lateral direction thereto.

2. A cover for a percolator pot comprising a body having a curved upper surface wall, a hollow top piece having an inner wall and extending centrally from said surface wall thereabove, the inner wall of said top piece being provided with spaced apart circular shaped projections, a floater accommodated within said top piece and intermediate said spaced apart circular shaped projections, said floater being arranged for up and down movement within said top piece when impinged upon by spurts of boiling water from within the percolator top, whereby upon abutment of said floater against said projections audible signal means are perceivable from without said percolator top piece.

3. A cover for a percolator pot according to claim 2, wherein said floater is provided with a centrally arranged rod, said top piece being provided with an opening through which said centrally arranged rod extends therewithout, and means at the end of said rod to abut against the outer surface of said top piece during said downward movement of said floater.

4. A cover for a percolator pot comprising a body having an upper surface wall provided with a central opening, a hollow top piece including a hollow outer holder piece and an inner holder piece, said inner holder piece extending through said opening, said outer holder piece and said inner holder piece being each provided with a flange for abutment against said upper surface wall thereabove and therebelow, respectively, interengageable means for joining said outer holder piece with said inner holder piece, said outer holder piece adjacent said opening being provided with a ring-shaped projection extending into the space defined by said outer holder piece, said inner holder piece being provided with a ring-shaped top plate, and a floater extending for movement between said projection and said ring-shaped top plate, whereby said floater abuts against said top plate and said projection during movements of said floater caused by impingement of spurts of boiling water from within the percolator pot.

5. A cover for a percolator pot according to claim 4, wherein said floater is provided with a guide rod extending centrally of said floater and through a perforation provided in said outer holder piece.

6. A cover for a percolator pot comprising a body having an upper surface wall, a hollow top piece extending centrally from said surface wall thereabove, spaced apart annular abutment projections extending from said top piece thereinto and positioned at approximately half the height of said top piece, and a floater accommodated within said top piece and intermediate said spaced apart annular projections, said floater being arranged for up and down movements within said top piece when impinged upon by spurts of boiling water from within the percolator top, whereby upon abutment of said floater against said projections audible signal means become perceivable from without said percolator top piece.

RALPH ZIDE.

REFERENCES CITED

The following references are of record in the file of this patent:

UNITED STATES PATENTS

| Number | Name | Date |
|---|---|---|
| 711,385 | Coyle | Oct. 14, 1902 |
| 848,816 | Duerr | Apr. 2, 1907 |
| 967,954 | Morrison et al. | Aug. 23, 1910 |
| 1,128,242 | Gillis | Feb. 9, 1915 |
| 1,596,415 | Enright | Aug. 17, 1926 |
| 1,648,407 | Kumagai | Nov. 8, 1927 |
| 2,536,369 | Hubbard | Jan. 2, 1951 |
| 2,538,583 | Morrison | Jan. 16, 1951 |

FOREIGN PATENTS

| Number | Country | Date |
|---|---|---|
| 12,390 | Germany | June 25, 1896 |
| 101,987 | Switzerland | Nov. 1, 1923 |